Jan. 31, 1939.  H. H. PATTERSON  2,145,457
ADVERTISING DISPLAY
Filed April 14, 1937  2 Sheets-Sheet 2
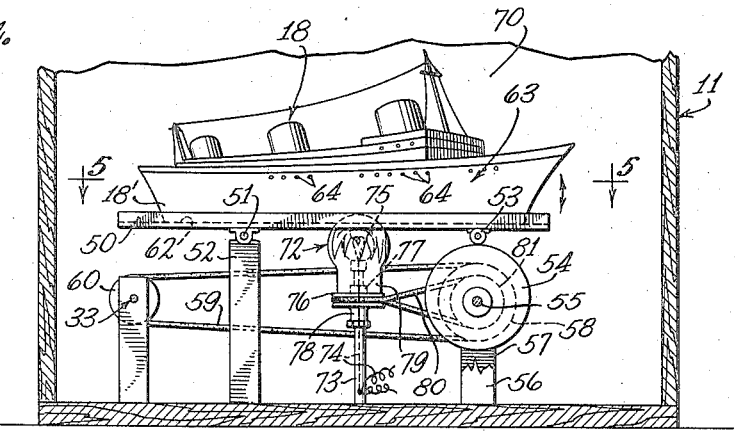
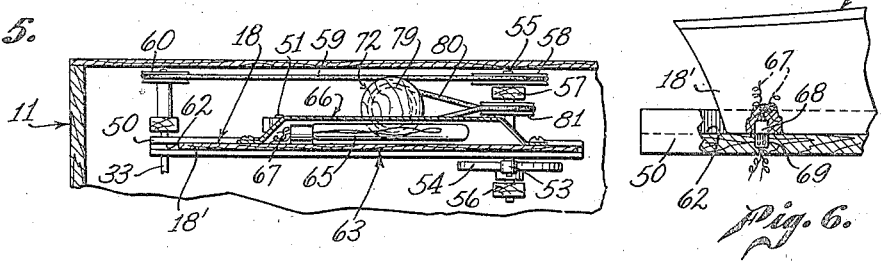
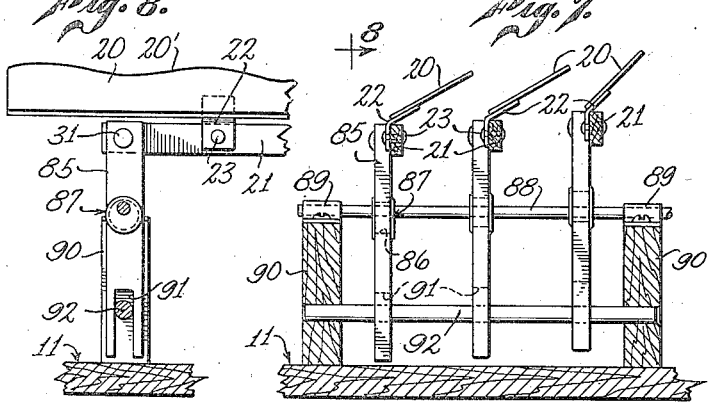
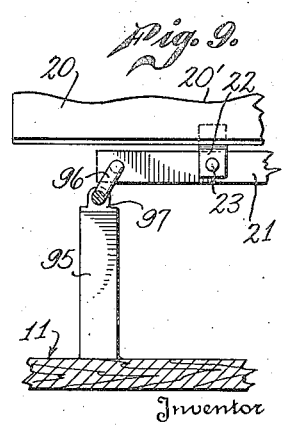
Inventor
Harold H. Patterson
By [signature]
Attorney Patented Jan. 31, 1939

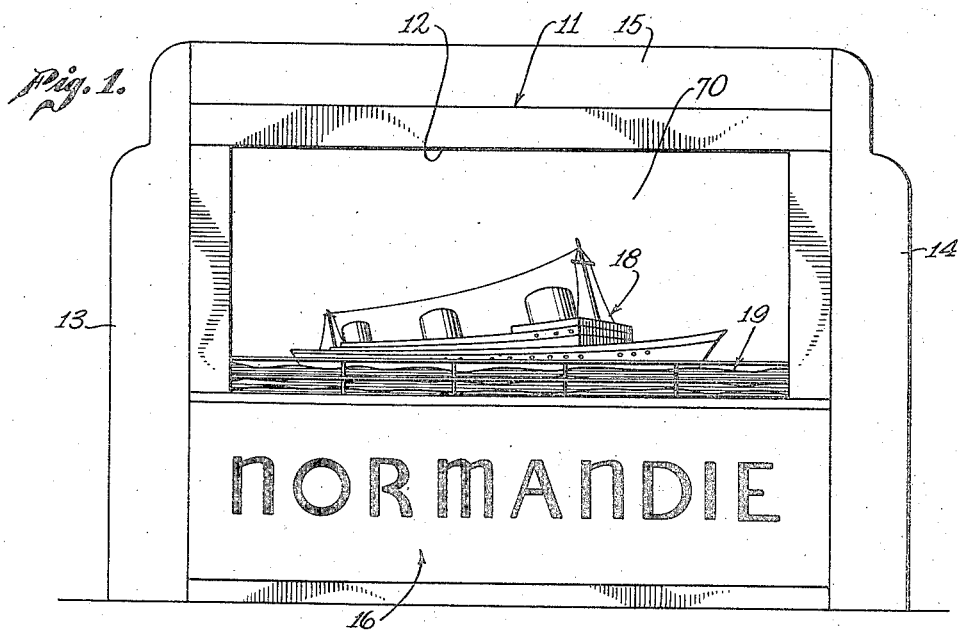
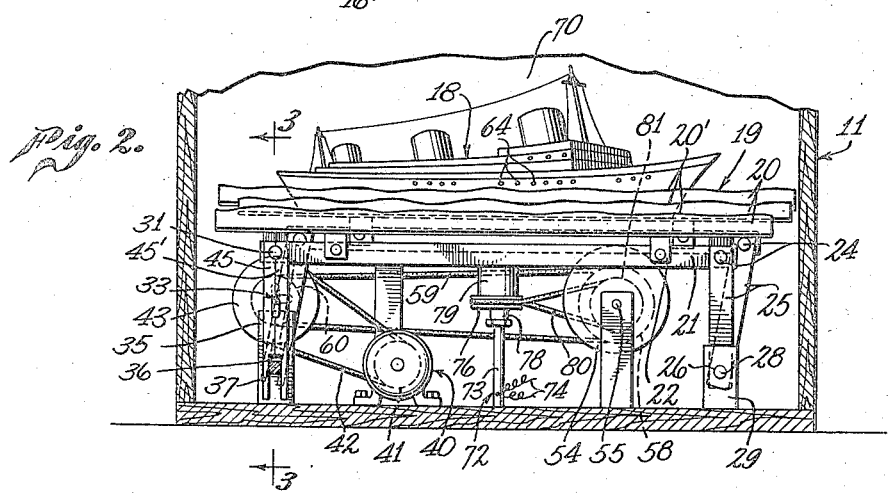
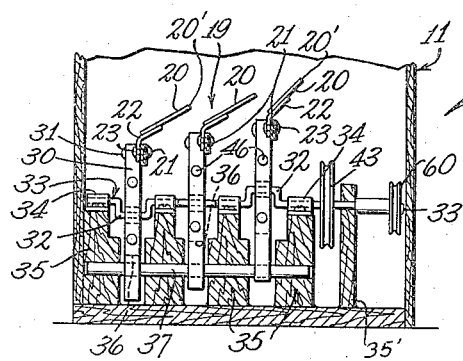

2,145,457

UNITED STATES PATENT OFFICE 2,145,457

ADVERTISING DISPLAY

Harold H. Patterson, Los Angeles, Calif.

Application April 14, 1937, Serial No. 136,887

11 Claims. (Cl. 40—126)

This invention relates generally to advertising devices and more particularly to that type of advertising device which simulates ocean waves or the like as a part of the display.

The invention contemplates the provision of an advertising device which includes the display of a miniature ship replica behind a foreground adapted to simulate ocean waves or the like in miniature. There are advertising devices at the present time which are designed to create an illusion of ocean waves or the like as a part of the display but to my knowledge none of these devices simulates the wave effect close enough to create the desired illusion in the eyes and mind of an observer.

It therefore is a primary object of this invention to provide an improved advertising device which includes simple and effective mechanical means for creating an illusion of ocean waves or the like with a ship so supported and moved in a manner as to simulate the actual movement of a ship riding the waves that the illusion of actuality is impressed on the observer. It is a particular object of this invention to provide new and improved means for effectively simulating wave motion to create an illusion of natural waves on real water.

It is a further object of this invention to provide means for mounting objects, such as ship models or the like, so that they may be readily interchanged in the display as desired.

It is also an object of this invention to provide an advertising device which gives the general appearance of a boat sailing upon the ocean with a background adapted to simulate the sky and clouds moving across it, all enclosed in a housing and framing so that the whole presents an arresting and pleasing appearance. Finally it is an object of this invention to provide an advertising display of the class described which may be easily and cheaply manufactured and which is designed for a long operating life with a minimum of attention.

These and other objects are apparent from the description and drawings. Referring to the drawings, which are for illustrative purposes only, Fig. 1 is a front elevation of the advertising device embodying a preferred form of the invention.

Fig. 2 is a fragmentary sectional front elevation of the device showing the principal parts designed to create the wave-like effect.

Fig. 3 is a fragmentary sectional elevation of the wave strip actuating mechanism on line 3—3 of Fig. 2.

Fig. 4 is an elevation of the mechanism for supporting and rocking the object to be displayed, and for rotating the light means which may be used to produce a cloud effect.

Fig. 5 is a fragmentary sectional plan view on line 5—5 of Fig. 4.

Fig. 6 is an enlarged detail view of the means for establishing electrical contact between the cradle and an object therein. The parts are broken away to show them in section.

Fig. 7 is a fragmentary sectional elevation of a modified means for imparting motion to the wave strips.

Fig. 8 is an elevation of one of the connecting rods taken on line 8—8 of Fig. 7.

Fig. 9 is a fragmentary side edevation of a wave strip showing another means for imparting motion to the wave strip.

Referring to the drawings, Fig. 1 is a front elevation of the device which comprises a housing 11 which is box-like in form and provided with a rectangular opening 12 in the front thereof which is designed to make the housing appear as a miniature stage. The front of the housing is provided with suitable facing members 13, 14 and 15, designed to give the display a pleasing appearance. On the front of the housing below the opening 12 is a panel, 16, which is designed to accommodate a card which may contain advertising material, as for example the name of the ship, the model of which is displayed. For the purpose of illustration the word "Normandie" is lettered thereon.

Inside the housing and visible through the opening 12 is the object to be displayed, in this case the ship model 18, behind a foreground of what may be termed mechanical waves, generally indicated by reference numeral 19.

One of the principal objects of this invention has been pointed out to be the simulation of wave motion by mechanical means in order to create an illusion in the mind of an observer of the advertising display that the object displayed therein is actually associated with real water. To accomplish this object, wave strips 20 are provided which may be of cardboard or any suitable material having a waved upper edge 20'. The front sides of the strips are painted to resemble water as indicated by the lining on the strips in Fig. 1, which represents the color blue.

These wave strips are mounted at an angle to the horizontal, preferably extending upwardly and rearwardly from their supporting structure, as shown in Fig. 3. This supporting structure comprises bars 21 to which the wave strips are connected by means of brackets 22 cooperating with pins 23. The rear wave strip, which is farthest removed from the eyes of an observer, is mounted more nearly vertical than the other strips. This aids in creating the illusion, but it is not essential to this invention that the wave strips be mounted exactly as shown.

The bars are pivotally supported at one end at 24 on supporting links 25, which are pivotally mounted at 26 on a fixed shaft 28 mounted in posts 29. At their other ends, the bars 21 are respectively pivotally mounted on connecting rods 30 at each of points 31. The connecting rods are mounted on the cranks 32 of the crank shaft 33 which is supported by bearings 34 on the posts 35. The shaft is additionally supported by post 35'. The connecting rods are slotted at their lower ends as shown at 36 to accommodate a stationary shaft 37 which they straddle and slidably engage.

An electric motor 40 is provided having a pulley 41 which drives a belt 42 extending around a pulley 43 mounted on and keyed to the crank shaft 33. The electric motor thus serves to rotate the crank shaft which reciprocates the connecting rods 30. By reason of the fact that the connecting rods straddle the bar 37 at their lower ends they are free to move longitudinally but not laterally at the points where they engage the bar. The connecting rods may be described as being slidably pivotally mounted on the shaft 37. The rotation of the crank shaft thus causes the upper ends of the rods to travel in a flat elliptical path.

From this description it can be seen that each wave strip is reciprocated in a peculiar motion which gives the illusion of waves flowing from one side of the display to the other. The motion imparted to the wave strips can best be comprehended when it is realized that each of the pivotal points 31 travels in a flat elliptical path as explained above, while each of the pivotal points 24 oscillates in an arcuate path by reason of the fact that the supporting links 25 are pivoted at their lower ends.

Referring particularly to the connecting rods as shown in Figures 2 and 3, it has been found desirable to make the front two rods (those nearest an observer) of the same length and to make the rear rod slightly longer, although the relative lengths may be varied without departing from the scope of the invention. The rear supporting link 25 is of course made correspondingly longer than the other links 25. To facilitate assembly, each of the connecting rods are split and comprise halves 45 and 45' which are held together by demountable pins 46 of any suitable type.

In combination with the means for producing the illusion of water and waves there is provided means for supporting and rocking an object, such as the ship model illustrated, which comprises a cradle member 50, one end of which is pivotally mounted at 51 on the post 52. At its other end the cradle member is provided with a roller 53 which rides upon the periphery of an eccentric 54 fixedly mounted on a shaft 55. This shaft is rotatably mounted in posts 56 and 57. Fixedly mounted on the shaft 55 is a pulley 58 which is rotated by the belt 59 from a pulley 60 mounted on the crank shaft 33. The rotation of the shaft 55 rotates the eccentric upon which one end of the cradle rides, thus rocking that member.

The cradle 50 is provided with a longitudinal channel or groove 62 which is adapted to accommodate the keel 18' of the ship model 18. This ship model has a front portion 63 of any suitable material, which is formed and painted to resemble the side of a ship. It preferably has formed therein translucent portholes 64 which are lighted by an electric lamp 65 enclosed by a supporting and housing structure 66 formed on the back of the ship model. Wires 67 connect the lamp to an electrical plug 68 on the keel of the ship. The cradle member 50 (see Fig. 6) is provided with an electrical socket 69 for reception of the contacts of plug 68 and may be connected to a suitable source of electric potential. When the ship is set into the groove in the cradle the contacts on the plug in the keel engage the contacts in the socket in the cradle, thereby completing an electric circuit through the lamp.

With this construction it is contemplated that several objects may be used in the display over a period of time, the objects all being provided with a keel or rib similar to the one shown on the ship model, so that they may be readily interchangeable in the display. It is only necessary to lift out one model and insert the next to make the change, the electrical illumination of the object being provided for as above described.

In conjunction with the apparatus above described there is provided means for causing light to pass across a background 70 painted to resemble the sky (not shown) which comprises electric lamp means generally indicated by reference numeral 72. A tube 73 is mounted on the floor of the housing 11 and contains the wires 74 which are connected to an electric lamp 75 mounted on top of the tube. Rotatably mounted on the tube is a pulley 76 which is held in place by collars 77 and 78. The pulley carries a translucent cover member 79 which encloses the lamp and which may be painted to allow rays of light to escape at irregular portions. Rotation of the cover is effected by means of belt 80 connecting the pulley 76 with a pulley 81 mounted on the shaft 55 and rotated thereby.

In Figs. 7 and 8 a modified form of wave actuating mechanism is shown. In this form of the invention the connecting rods, here indicated by reference numeral 85, are apertured at 86 to accommodate the eccentrics 87 which rotate with the shaft 88. The shaft 88 takes the place of the crank shaft 33 described above and is rotated in a manner similar thereto. The shaft is supported by the bearings 89 on the posts 90. The connecting rods are slotted at 91 at their lower ends in order to straddle the shaft 92. By means of this mechanism the same motion is imparted to the connecting rods and to the cross arms and wave strips attached thereto as in the other form of the invention.

This invention contemplates various means for actuating the wave strips and it is not necessarily limited to the impartation of an elliptical movement at one of the pivotal points of the wave strip. In this connection, in Fig. 9 is shown another modification of means for imparting motion to the wave strip. On the housing floor 11 is mounted post 95 which supports crank shaft 96 upon bearing 97. It is contemplated that this crank shaft have additional support and be rotated in a manner similar to that described in connection with the form of the invention shown in Figs. 2 and 3. In this case the bar 21 to which the wave strip 20 is attached is directly mounted on the crank shaft 96 and thus receives a circular motion at that point. It is also within the scope of this invention to use an eccentric or some other means in connection with the member 21 in place of the crank shaft illustrated.

Although the electrical connections have not all been shown, it is contemplated that suitable wiring be provided for connecting the motor, the contacts 68 and 69 and the wires 74 to a source of electric potential in any well known manner.

In the description of the invention no particular speed of rotation of the crank shaft 33, the shaft 88 or crank shaft 96 of the various forms of the invention was set forth, but it has been found that excellent results are obtained when these shafts are rotated between eight and twelve revolutions per minute.

It is apparent from the above description that with the operation of the various mechanisms described, that a simulation of the natural effect of a ship riding the waves is produced by the combined motion of the waves and that of the ship.

I claim as my invention:

1. In a device of the class described, the combination of: a wave strip; a supporting member pivotally connected to the wave strip; and means for moving said supporting member to impart an elliptical motion to the pivotal connection between said wave strip and said supporting member.

2. In a device of the class described, the combination of: a wave strip; means for pivotally supporting said strip at two points; and means for actuating said supporting means so that one of the pivot points oscillates and the other point moves in an elliptical path.

3. In a device of the class described, the combination of: a wave strip; supporting structures for said strip pivotally engageable with the strip at two separate points on the strip; and means for operating said supporting structures to impart a different type of movement at one of said points from that imparted at the other of said points.

4. In a device of the class described, the combination of: a pivotally mounted supporting link; a connecting rod; a wave strip, said wave strip being pivotally connected to said supporting link and to said connecting rod; and means for imparting movement to said connecting rod at a point intermediate its ends.

5. In a device of the class described, the combination of: a housing; a pivotally mounted supporting link; a crank shaft; means for rotating said crank shaft; a connecting rod mounted on said crank shaft; and a wave strip pivotally connected to said supporting link and to said connecting rod.

6. In a device of the class described, the combination of: a housing; a pivotally mounted supporting link; a crank shaft; a stationary shaft; a connecting rod mounted on said crank shaft, said rod having a slotted lower end for engagement with said stationary shaft; and a wave strip pivotally connected to said supporting link and to said connecting rod.

7. In a device of the class described, the combination of: a housing; a crank shaft mounted in said housing; means for rotating said crank shaft; a connecting rod mounted on said crank shaft; a wave strip pivotally connected to said connecting rod; and means for supporting said wave strip at a point spaced from the pivotal connection of the wave strip to the connecting rod.

8. In a device of the class described, the combination of: a housing; a crank shaft mounted in said housing; means for rotating said crank shaft; a stationary shaft mounted in said housing; a connecting rod mounted on said crank shaft, said connecting rod having a slotted lower end adapted to engage said stationary shaft; a wave strip pivotally connected to the upper end of said connecting rod; and means for supporting said wave strip at a point spaced from the pivotal connection of the wave strip to the connecting rod.

9. In a device of the class described, the combination of: a housing; a crank shaft mounted in said housing; means for rotating said crank shaft; a stationary shaft mounted in said housing; a connecting rod mounted on said crank shaft, said connecting rod having a slotted lower end adapted to engage said stationary shaft; a wave strip pivotally connected to the upper end of said connecting rod; and means for supporting said wave strip at a point spaced from the pivotal connection of the connecting rod, said means comprising a link pivotally mounted at its lower end and pivotally connected to said strip at its upper end.

10. In a device of the class described, for use in displaying ship models or the like, the combination of: a housing; a plurality of wave strips; supporting structures for each of said wave strips pivotally engaging said strips at spaced points; means for actuating said supporting structures so that one of said pivot points on each of said strips travels in an elliptical path; a cradle pivotally mounted in said housing; and means for rocking said cradle, in timed relation to the motion of said strips.

11. In a device of the class described, the combination of: a housing; wave strips mounted in said housing; a cradle; a ship model removably mounted in said cradle, said ship having an electric lamp therein; means for effecting electric contact between said cradle and said electric lamp in said ship model, said means comprising electrical contacts on said ship model and on said cradle adapted to engage when said ship model is mounted in said cradle; and means for simultaneously rocking said cradle and oscillating said strips.

HAROLD H. PATTERSON.